US009075891B2

(12) United States Patent
Brun et al.

(10) Patent No.: US 9,075,891 B2
(45) Date of Patent: Jul. 7, 2015

(54) METHOD AND DEVICE FOR EDITING AN OBJECT REPRESENTED IN A WEB PAGE

(75) Inventors: Alain Brun, Le Gua-VIF (FR); Julien Wajsberg, Montrouge (FR); Samir Salibi, Rueil-Malmaison (FR)

(73) Assignee: Orange, Paris (FR)

( * ) Notice: Subject to any disclaimer, the term of this patent is extended or adjusted under 35 U.S.C. 154(b) by 877 days.

(21) Appl. No.: 12/616,264

(22) Filed: Nov. 11, 2009

(65) Prior Publication Data

US 2010/0122188 A1      May 13, 2010

(30) Foreign Application Priority Data

Nov. 13, 2008   (FR) ...................................... 08 57717

(51) Int. Cl.
*G06F 3/0481* (2013.01)
*G06F 17/30* (2006.01)
(52) U.S. Cl.
CPC .... G06F 17/30893 (2013.01); G06F 17/30899 (2013.01)
(58) Field of Classification Search
CPC .................................. G06F 8/34; G06F 9/4443
USPC .......................................................... 715/763
See application file for complete search history.

(56) References Cited

U.S. PATENT DOCUMENTS

| | | | | |
|---|---|---|---|---|
| 7,197,531 B2* | 3/2007 | Anderson | ...................... | 709/203 |
| 7,765,472 B2* | 7/2010 | Fablet | ............................ | 715/249 |
| 7,975,231 B2* | 7/2011 | Hasuike et al. | ................ | 715/760 |
| 2003/0105795 A1* | 6/2003 | Anderson et al. | ............. | 709/101 |
| 2003/0204564 A1* | 10/2003 | Keene | ............................ | 709/203 |
| 2005/0104894 A1* | 5/2005 | Sanborn et al. | ................ | 345/592 |
| 2007/0113177 A1* | 5/2007 | Fablet | ............................ | 715/530 |
| 2008/0143742 A1* | 6/2008 | Jeong et al. | .................... | 345/619 |
| 2008/0209311 A1* | 8/2008 | Agronik et al. | ................ | 715/234 |
| 2008/0228789 A1* | 9/2008 | Asakawa et al. | .............. | 707/100 |
| 2009/0006454 A1* | 1/2009 | Zarzar et al. | ................... | 707/102 |
| 2009/0063998 A1* | 3/2009 | Huang et al. | ................... | 715/760 |
| 2009/0164620 A1* | 6/2009 | Ziegler et al. | ................. | 709/223 |
| 2010/0083146 A1* | 4/2010 | Hasuike et al. | ............... | 715/760 |

FOREIGN PATENT DOCUMENTS

WO   WO 2008/067621 A2   6/2008

OTHER PUBLICATIONS

Ohshima et al., "TinLizzie WysiWiki and WikiPhone: Alternative approaches to asynchronous and synchronous collaboration on the Web," Fifth International Conference on Creating, Connecting and Collaborating through Computing (C5'07), IEEE, PI, pp. 36-46 (Jan. 1, 2007).*
Cikic et al., "Concepts for Cooperative Knowledge Spaces in Mathematics and Natural Sciences," Proceedings of the 2006 International Conference on Cyberworlds (CW'06), IEEE, PI, pp. 99-106 (Nov. 1, 2006).

* cited by examiner

*Primary Examiner* — Reza Nabi
(74) *Attorney, Agent, or Firm* — Drinker Biddle & Reath LLP

(57) ABSTRACT

Method for editing an object represented in a page of a Web site, the method comprising a step of sending, by the server to said application, through a browsing link established between a server of said site and a terminal, first description data describing said object for a display of a graphical representation of said object in a user interface of said application and a set of program instructions, specific to a category of object to which said object belongs, said instructions being designed for execution by said application of functions for editing said graphical representation.

11 Claims, 4 Drawing Sheets

METHOD AND DEVICE FOR EDITING AN OBJECT REPRESENTED IN A WEB PAGE

CROSS-REFERENCE TO RELATED PATENT APPLICATION

This application claims the benefit of French Patent Application No. 08 57717, filed on Nov. 13, 2008, in the French Institute of Industrial Property, the entire contents of which is incorporated herein by reference.

FIELD OF THE INVENTION

The invention relates to the field of telecommunications and more particularly, to a method and device for editing an object represented in a Web page and accessible via a client application connected to a server.

BACKGROUND OF THE INVENTION

With the appearance of so-called Web 2.0 technologies, cybernauts are becoming active on the Internet, in that they are able to contribute, by virtue of appropriate software tools, to the enrichment of a content accessible via Internet sites.

A "Wiki" is an editable Web page. A Wiki site comprises at least one editable Web page. Wiki software allows users to create, modify, delete and publish the content of an article in text form and to add links to other relevant articles. This software therefore allows cybernauts to collaborate in the writing of a text.

With the Wiki software available, it is also possible to create or modify a table comprising text or to enrich the content by inserting an image or a graphical object (for example diagram, vector image, graphical representation of sound content, etc) or inserting a hypertext link to such an object.

Though it is also possible to refer to a graphical object, it is however not possible to modify such a graphical object by means of a simple Internet browser: the only solution is to record a version of this graphical object, to modify it by means of a software tool tailored to the file format used to represent this object, to record this graphical object after modification and then to update the Wiki site by downloading the modified graphical object. These operations are therefore irksome and often poorly mastered by an inexperienced user.

Furthermore, this solution works only if the user's terminal is equipped with software making it possible to edit the graphical object in the format in which it is available.

It is therefore apparent that there is a requirement for a technical solution allowing the members of a community to share pages via a Wiki site, with possibilities for creating, editing, managing and publishing a multimedia object contained in these pages, in particular a graphical object.

SUMMARY OF THE INVENTION

One of the aims of the invention is to remedy problems and drawbacks of the prior art and/or to afford improvements thereto.

The invention relates to a method for editing an object represented in a page of a Web site, the method comprising,
 a step of establishing, between a server and an application implemented by a terminal, a communication link for browsing said Web site,
 a step of sending, by the server to said application, via said link,
  first description data describing said object for a display of a graphical representation of said object in a user interface of said application and
  a set of program instructions, specific to a category of object to which said object belongs, said instructions being designed for an execution by said application of functions for editing said graphical representation, According to the invention, editing functions specific to a category of object are designed for the editing of a multimedia object belonging to this category so as to be able to be executed by the application used to browse the Web site. Furthermore, the data are transmitted through the link established to browse the Web site.

As the instructions are designed for an execution by said application, the process for editing an object from its graphical representation can be entirely integrated into a browsing application, of Web browser type, in particular while complying with the mechanisms of requests and communication protocols specific to this type of application.

According to one embodiment, the method according to the invention comprises a step of receiving via said link, by the server from the application, second description data relating to said object and generated by means of said program instructions following an execution of at least one function for editing said object, triggered by a user of said terminal. Thus an update of the description of the object is implemented by the application itself.

According to one embodiment, the method according to the invention comprises a step of identifying a category of object to which said object belongs on the basis of a category identification stored in association with said descriptive data, a set of program instructions specific to the identified category of object being transmitted during said dispatching step.

The consideration and the management, by the server, of the category of an object makes it possible to process each category of object in a manner tailored to this category; in particular the set of program instructions transmitted is specific to a category of object and thus designed to allow the editing of an object of this category. Therefore, the user need not search by himself for software capable of editing such an object: the editing functions are automatically selected and provided by the server on the basis of the object category stored.

The invention also relates to a server for the implementation of a method for editing an object represented in a page of a Web site, the server comprising:
 means for establishing, with an application implemented by a terminal, a communication link for browsing said Web site,
 means for sending to the application, via said link,
  first description data describing said object for a display of a graphical representation of said object in a user interface of said application and
  a set of program instructions, specific to a category of object to which said object belongs, said instructions being designed for an execution by said application of functions for editing said graphical representation.

The advantages stated for the method according to the invention are transposable directly to the device according to the invention.

According to one embodiment, the device according to the invention comprises means for receiving from the application, via said link, second description data relating to said object and generated by means of said program instructions following an execution of at least one function for editing said object, triggered by a user of said terminal.

According to a preferred implementation, the various steps of the method according to the invention are implemented by software or a computer program, this software comprising software instructions intended to be executed by a data processor of a device according to the invention and being designed to control the execution of the various steps of this method.

Consequently, the invention is also aimed at a program, able to be executed by a computer or by a data processor, this program comprising instructions for controlling the execution of the steps of a method such as mentioned above.

This program can use any programming language, and be in the form of source code, object code, or of code intermediate between source code and object code, such as in a partially compiled form, or in any other desirable form.

The invention is also aimed at an information medium readable by a computer or data processor, and comprising instructions of a program such as mentioned above.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded from a network such as the Internet.

Alternatively, the information medium can be an integrated circuit into which the program is incorporated, the circuit being adapted for executing or for being used in the execution of the method in question.

According to another implementation, the invention is deployed by means of software and/or hardware components. From this perspective, the term module can correspond in this document equally well to a software component as to a hardware component or else to a programmable hardware component, with or without integrated processor. A software component corresponds to one or more computer programs, one or more subroutines of a program, or in a more general manner to any element of a program or of a piece of software able to implement a function or a set of functions, according to what is described in respect of the module concerned. In the same manner, a hardware component corresponds to any element of a hardware assembly able to implement a function or a set of functions, according to what is described in respect of the module concerned.

BRIEF DESCRIPTION OF THE DRAWINGS

Other aims, characteristics and advantages of the invention will become apparent through the description which follows, given solely by way of nonlimiting example and with reference to the appended drawings in which.

DETAILED DESCRIPTION

Figure 1:
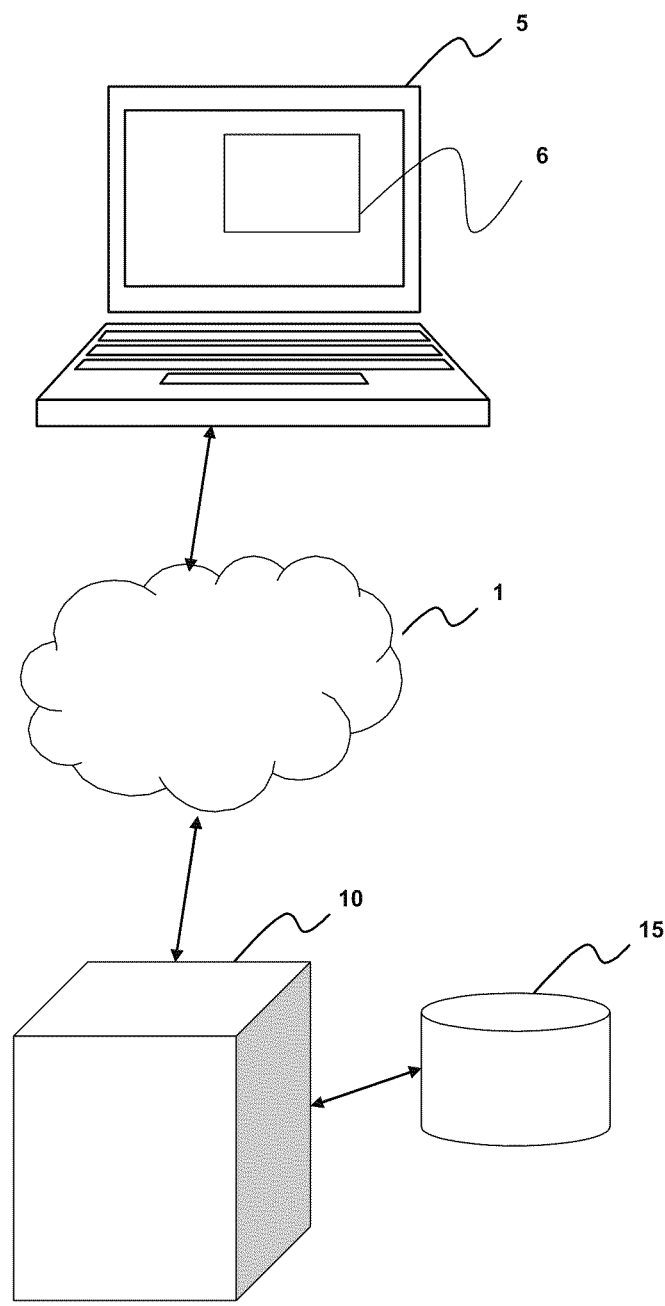
FIG. 1 schematically represents a system for editing an object of text type known in the prior art.

FIG. 1 schematically represents a telecommunication system implementing a Wiki site according to the prior art.

This system comprises:
a server 10,
a database 15 associated with the server,
a terminal 5, comprising a communication application able to establish a connection with the server 10.

After establishment of a connection between the terminal 5 and the server 10 and reception of a request to edit a content accessible via this server, the server 10 dispatches to the application:
presentation data, comprising a representation in the HTML format of a Web page, these data being intended to be interpreted by the communication application of the terminal 5 so as to display this Web page in the user interface of this application,
program instructions (for example in the JavaScript language)
as well as data describing the layout of the Web pages to be displayed (for example in the CSS format, Cascading Style Sheets).

The Web pages to be displayed comprise static information (texts, images, graphics, etc) which are intended to be displayed on the terminal 5 so that the user can consult them. These pages comprise hypertext links making it possible to trigger the execution of one or more functions for editing the content of a text as well as to save the modified text after editing. The editing functions may be more or less rich: pop-up menus, toolbar, etc.

The program instructions are intended to be interpreted and executed by the application of the terminal 5, as a function of determined actions by the user at the level of the user interface of this application.

The application of the terminal 5 exhibits browser-type operation: it displays the Web pages received, activates on user command the hypertext links by executing the actions associated with these links and interprets and executes the program instructions.

The server implements a module for processing the published text files. On request to edit a text originating from a user's terminal, the processing module of the server 10 transmits to the browser a page in the HTML format (HyperText Markup Language) containing the text to be edited. The text is presented to the user in an editable form, that is to say allowing modification of the alphanumeric content of this text. According to the embodiments, the HTML page also makes it possible to perform text formatting operations (character font to be used, format of the paragraphs, etc). The alphanumeric content (unformatted content) entered by the user, with the layout options, if any, requested by the user, is dispatched to the processing module 10 following an action by the user to validate his entry.

The processing module of the server 10 then generates an HTML page containing the text such as modified by the user and laid out in accordance with the layout options requested by this user, with a view to the transmission of this page to a terminal upon connection to the Wiki site. This HTML page is also transmitted to the terminal of the user that requested modification thereof in such a way that he can view the result of the modifications made to this text, and if appropriate, request a new modification of this content or of the formatting of the text.

Figure 2:
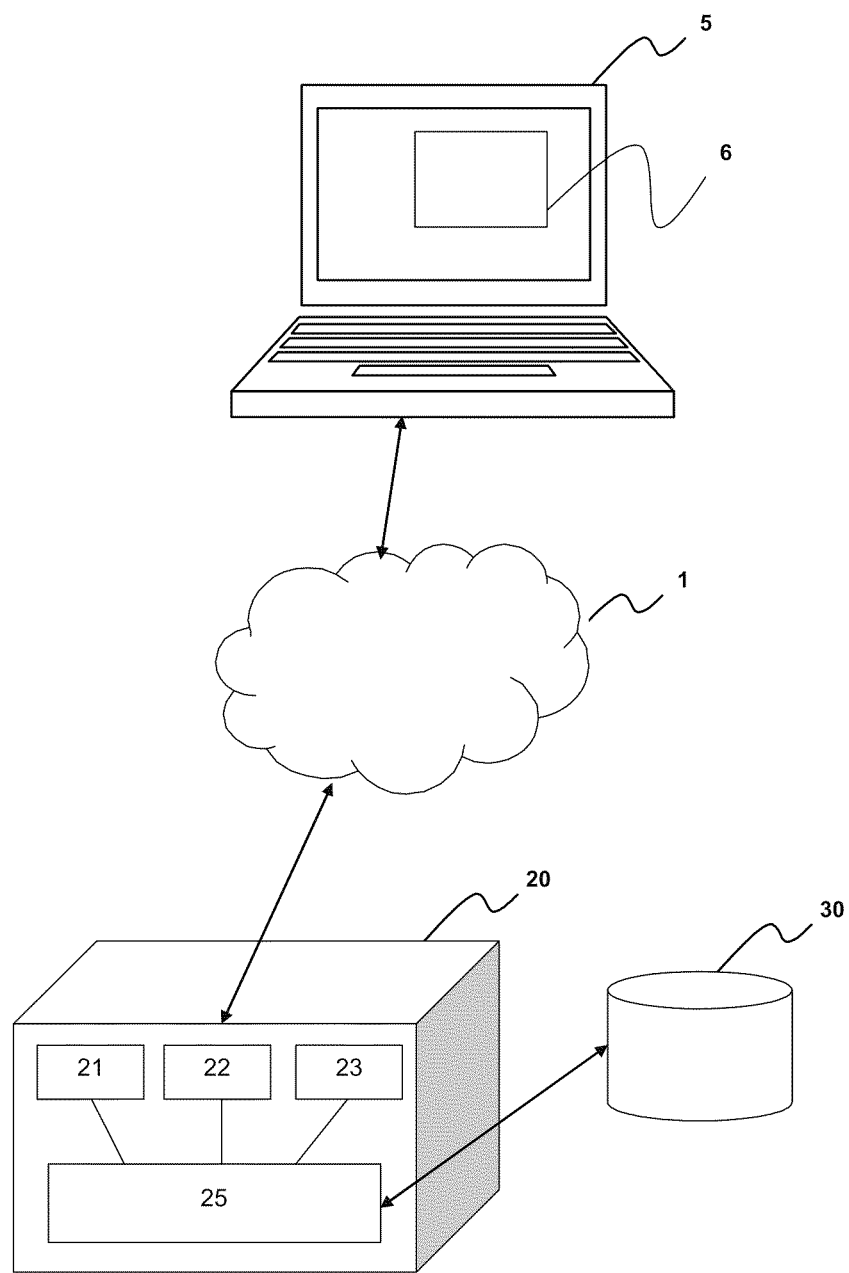
FIG. 2 schematically represents an object editing system integrating a device according to the invention.

FIG. 2 schematically represents a telecommunication system implementing one or more Wiki sites according to the invention.

This system comprises:
a network 1;
a server 20;

a database 30 associated with the server and managed by this server 20;

a terminal 5, comprising a browsing application 6 able to establish a connection with the server 20 through the network 1.

The browsing application 6 comprises basic communication functionalities of a Web browser: it dispatches requests to the server 20 and receives in return a Web page to be interpreted and displayed on the terminal 5. In the subsequent description, it is assumed that the application 6 is a Web browser. The application 6 is also designed to interpret and execute program code instructions received from a server.

The invention proposes an object editing mechanism applicable to various categories of object. With this aim the server 20 comprises a plurality of processing modules 21 to 23, each processing module being associated with a category of editable object and being designed to process the data exchanges between the server 20 and the browser 6 which are performed during operations for editing and/or consulting an object belonging to this category.

A category of content is identified for example by means of the MIME standard (Multipurpose Internet Mail Extensions). This standard defines types of objects (text, image, graphics, application, etc.) and sub-types for each type of object, a sub-type usually corresponding to a particular representation format for this type of object. For example:

when an object of text type is in the raw text format (i.e. alphanumeric format), its category according to the MIME standard is "text/plain";

when an object of text type is in the HTML format, its category according to the MIME standard is "text/html";

when an object of sound type is in the "Way" format, its category according to the MIME standard is "audio/way";

when an object of sound type is in the "MP3" format, its category according to the MIME standard is "audio/mpeg";

when a graphics object is in the BPMN format, its category according to the MIME standard is for example named "application/processpedia", so as to indicate the use of a proprietary description format based on XML;

etc.

The database 30 is designed to store, for each editable object, a description DDESC of this object in association with an identification DTYPE of the category to which this object belongs.

The description of an editable object is stored in the database under a description format tailored to each category of object.

In the case of a structured object (that is to say, an object having a structure, for example in the form of a diagram with graphical elements interconnected by arrows or lines), the description format preferably consists of a text language description, effected for example by means of the XML language (Extensible Mark-up Language). Such a description is advantageously usable for various categories of structured objects: not only texts and technical diagrams, but also vector images. Other appropriate languages are also usable. Advantageously, the use of a language that a browsing application (Web browser) is capable of interpreting makes it possible to implement the invention without modifying such an application.

In the case of an unstructured object, for example in the case of an audio content or of a pixel image, a binary representation format is used and stored in an appropriate file format (JPEG, TIF, WAV etc.). An XML format comprising the data of this binary representation is also usable.

The description DDESC stored in database 30 is assumed to be in XML language in the following lines.

With this assumption when, for a structured object which is to be integrated into a Wiki site, no XML language representation is available, a description of this object under a proprietary format is converted into an XML language description, the latter being that stored in database 30 for publication via the Wiki site.

With this aim, each of the modules 21 to 23 is able to convert a description of an object of a given category, from the XML format to one or more other formats commonly used for this category of object and vice versa.

If for example the module 21 is associated with the category of object comprising the graphical descriptions of processes complying with the BPMN standard (Business Process Modeling Notation), this module is able to convert a BPMN description into an XML description and/or, conversely, an XML description into a BPMN description.

These conversion functions are activatable also on the request of a user connected to the server 20 to import an object under a proprietary format so that it is recorded in the database 30 or, conversely, to export to a proprietary format an object stored in the database 30, so that it is editable by means of proprietary software of the terminal 5, independent of the browsing application 6.

The server 20 also comprises a processing module 25, termed the common module, serving as interface between the database 30 and the processing modules 21 to 23, termed the specific modules, each module being particular to a category of editable object. The module 25 knows the category of object associated with each of the specific modules, each specific module 21 to 23 being referenced with the common module 25. The common module is thus able to determine in dependence on the category of object to which an object belongs which is the appropriate processing module for this object.

The common module 25 implements the customary functions for managing access to the Wiki site, in particular the reception and processing of requests to access the pages of the site. The common module 25 also implements security functions (identification and/or authentication of users in particular) necessary for the control of such access.

Furthermore, the common module according to the invention receives the requests to edit or consult an object DOBJ originating from the applications implemented on the terminals. The common module is designed so as, in case such a request should be received, to identify, as a function of the category of object DTYPE recorded in the database 30 in association with a description DDESC of an object DOBJ, which, from among the modules 21 to 23, is the processing module able to process the exchanges of data relating to this object: the processing module 21 to 23 identified is then activated by the common module 25 with a view to the implementation, server side, of the operations necessary for editing or consulting this object.

The management of a new category of editable object is possible simply by integrating a new processing module, associated with this category of object and able to process the exchanges of data for editing and/or consulting the objects of this category. It then suffices that this new module is referenced with the common module 25 so that the common module can activate the new module in the case of a request relating to an object belonging to the category associated with the new module.

Each processing module 21 to 23 is designed to implement data processing functions allowing the editing and consultation of an object of a category of object. As an alternative, two distinct modules are provided: the first for implementing the functions allowing editing, the second for implementing the functions allowing consultation of an object of this category.

These processing functions are implemented in the manner described below.

After establishment of a connection between the terminal 5 and the server 20 and reception of a request to edit or consult an object DOBJ of a category DTYPE accessible via this server, the processing module 21 to 23 associated with the category DTYPE is activated by the common module. The processing module 21 to 23 is then designed to dispatch to the application, in accordance with the protocol used while browsing the Web site, the following data:

- presentation data, comprising a representation in the HTML format of a Web page;
- data (for example in the CSS format) defining a Web page layout to be applied when displaying the Web page provided; and
- program instructions DINST (for example in the JavaScript language) intended to be interpreted and executed by said application 6.

The program instructions DINST are designed to download from the server 20 and interpret a description DDESC1 of the object DOBJ to be edited so as to produce a graphical representation DREPR1 of said object, intended to be displayed in the user interface of the application 6 and by mean of which said object may be edited.

The program instructions DINST are also designed to implement one or more functions for editing and consulting the object DOBJ, which may give rise to a modification of the object DOBJ.

The description DDESC1 of the object DOBJ to be edited is a description in text language, like XML language or another description language or in binary format. The description DDESC1 is transmitted to the application 6 either in the format (for example XML) in which this description is stored in the database 30, or in an optimized format (for example JSON) allowing fast interpretation of this description by the application 6. The object's graphical representation DREPR1 obtained after interpretation of the description DDESC1 is combined with the presentation data received from the server so as to produce the Web page which will be displayed in the user interface of the application 6.

Figure 4:
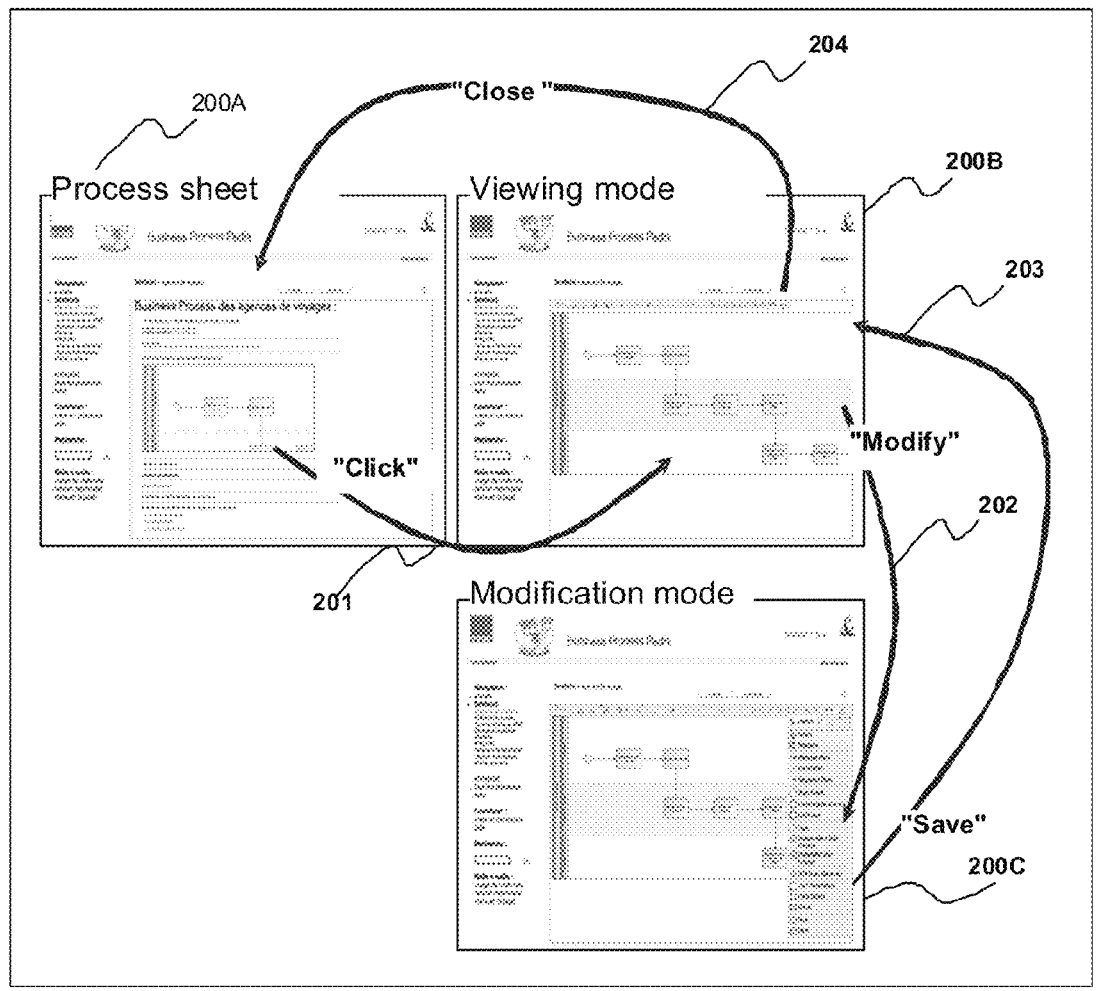
FIG. 4 represents user interfaces used in an embodiment of the method according to the invention.

The displayed Web page has for example the appearance of the Web page 200B represented in FIG. 4. This Web page comprises at least one user interface element (menu, button, hypertext link or other) for, in the case of a predefined action by the user on this element, triggering the execution of a process for editing the object represented in this Web page 200B.

The user interface elements allowing the editing of an object originate from two possible sources:

- either they are created by means of the program instructions DINST, which, in this case comprise instructions for creating user interface elements,
- or the presentation data initially received from the server comprise data intended to be interpreted by the browser so as to present these user interface elements to the user.

The user interface used for editing an object has for example the appearance of the Web page 200C represented in FIG. 4: it comprises menus, buttons, links or other user interface elements allowing the activation of the available editing functions.

According to one embodiment, the Web page 200C results from a local partial modification of the Web page 200B: in this case the program instructions DINST comprise solely the user interface data intended to be interpreted by the browser so as to modify the page Web200B in the requested manner.

The editing functions defined in the program instructions DINST are tailored to the editing of an object of a given category. As indicated in introduction, the invention is providing a solution for editing (creating, modifying, etc) a graphical object, that is to say, a graphical representation of any kind of object: for example, the graphical representation of a sound content.

For example, when the object is a diagram representing a technical process, the editing functions included in the program instructions DINST transmitted by the corresponding processing module are for example:

- functions for drawing new graphical elements of the diagram;
- functions for editing a graphical element of the diagram, for example changing the shape of this element, its size, its color;
- functions for moving or removing a graphical element of the diagram;
- functions for adding text or for correcting a text associated with a graphical element of the diagram;
- functions for adding text or for correcting a text associated with the diagram, for example its version;
- etc;

In the exemplary case of an object in the form of a diagram representative of a technical process (in the BPMN format, for example), a function for drawing an element is for example the plotting of an arrow between two points of the diagram. The corresponding program instructions DINST are for example the following (case of the JavaScript language):

```
{
    var canvas = document.createElement('canvas');
    if (canvas.getContext){
        var ctx=canvas.getContext("2d");
    //first part
    ctx.beginPath( );
    ctx.moveTo(mx,y1);
    ctx.lineTo(mx+thickness,y1);
    ctx.lineTo(mx+thickness,y2+20);
    ctx.lineTo(mx,y2+20);
    ctx.fillStyle = color;
    ctx.fill( );
    // Arrow
    ctx.moveTo(mx+(thickness/2),y2−thickness);
    ctx.lineTo(mx+(thickness/2)+(3+thickness),y2+20);
    ctx.lineTo(mx+(thickness/2)−(3+thickness),y2+20);
    ctx.fillStyle = color;
    ctx.fill( );
}
```

The execution of this function gives rise to a modification of the graphical representation of the object displayed on the screen, by activating plotting functions (functions "moveTo", "lineTo", "fillStyle" and "fill").

As illustrated above, the editing functions included in the program instructions DINST transmitted by the corresponding processing module comprises:

- functions for drawing new graphical elements of the graphical representation of said object;
- functions for editing a graphical element of the graphical representation, for example changing the shape of this element, its size, its color;
- functions for moving or removing a graphical element of the graphical representation;
- functions for adding text or for correcting a text associated with a graphical element of the graphical representation;

functions for adding text or for correcting a text associated with the graphical representation, for example its version;

etc.

The program instructions DINST comprise user interface data, defining the user interface necessary for editing an object. This user interface elements are presented to the user in a Web page and are displayed in said application 6, so as to comply with the browser-specific user interface management mechanism.

By way of example, FIG. 4 comprises a representation of a Web page 200C presenting the user with a palette of tools, in the form of icons, menus and buttons, etc, making it possible to activate various functions for editing a graphical object. The program instructions DINST received and the Web page 200C are designed in such a way that the browser triggers the execution of an editing function in the case of a user action effected at the level of the user interface on a graphical element associated with this function.

When an editing function giving rise to the modification of the object DOBJ is executed, this modification is depicted by displaying in the user interface of the browser a modified graphical representation of the object such as modified.

Generally, the program instructions DINST are designed to manage all the inputs/output at the level of the user interface of the application 6: that is to say both the consideration of the user's actions (data entry into a text field, activation of particular keys of the keyboard, actions input by means of a pointing facility of mouse or other type, etc) and also the implementation of the display modifications—in particular of the graphical representation DREPR1 of the object DOBJ—which are envisaged in response to these actions. All the inputs/output are therefore managed by the application 6 by means of the program instructions DINST without it being necessary to call upon another software application.

More precisely, the program instructions DINST are designed so as, following the execution of at least one editing function that has given rise to at least one modification of the object DOBJ, to cause the updating by the application 6 of the graphical representation DREPR1 of the object DOBJ such as displayed in the user interface of the application 6 on the terminal 5. The operation of updating the graphical representation DREPR1 is preferably performed after each execution of an editing function that has given rise to a modification of the object. This results in a modified graphical representation DREPR2.

The program instructions DINST are designed to update and/or save the descriptive data DDESC1 of the object DOBJ such as modified after editing. The updating of the descriptive data DDESC1 of the object DOBJ is performed preferably when requested by the user, when the latter requests a save of the object that he has just edited, but can also be done automatically and either periodically, or upon each modification.

According to a first variant embodiment, the updating is performed by the application 6. With this aim, the program instructions DINST comprise instructions for updating the description DDESC1 of the modified object DOBJ after editing by converting description data describing the graphical representation DREPR2 displayed for the modified object DOBJ and generating modified description data DDESC2, the data DDESC2 being in the same format as the initial descriptive data DDESC1 (XML format, for example).

In this first variant, the program instructions DINST also comprise instructions for transmitting, in accordance with the protocol used while browsing the Web site, to the processing module 21 to 23 considered, the updated descriptive data DDESC2 such as generated by the application 6.

The processing module considered is designed so as, on receipt of descriptive data DDESC2 of a modified object, to transfer these descriptive data DDESC2 received to the common module 25 for updating of the descriptive data DDESC1 stored in the database 30, in such a way that these updated data are those transmitted to a terminal upon a subsequent request, issued by this terminal, for access to this object.

According to a second variant embodiment, the updating is performed by the processing module 21 to 24 of the server 20 which is associated with the category of object to which the modified object DOBJ belongs. In this second variant, data describing at least some of the graphical elements making up the graphical representation DREPR2 of the object DOBJ, such as displayed in the user interface of the application 6 after modification of the object DOBJ, are transmitted to the processing module considered.

In the exemplary case of a modification of the graphical representation DREPR1 by arrow plotting, the coordinates of the plotted arrow are transmitted to the server together with by a code identifying the graphical element of "arrow" type and of formatting parameters for this graphical element. The data describing the other graphical elements making up the modified graphical representation DREPR2 of the object DOBJ are transmitted preferably simultaneously.

The processing module considered is designed to convert the description data describing the modified graphical representation DREPR2 into description data DDESC2 describing the object DOBJ. In this second variant, the data DDESC2 are also in the same format as the initial descriptive data DDESC1 (XML format, for example).

The processing module considered is designed to thereafter transfer these modified descriptive data DDESC2 to the common module 25 for updating of the descriptive data DDESC1 stored in the database 30, in such a way that these updated data are those transmitted to a terminal upon a subsequent request, issued by this terminal, for access to this object.

In the embodiment which has just been described, any application 6 comprising functionalities of a Web browser may be used to communicate with the server 20 without it being necessary to modify it or to supplement it with a complementary software module of "plug-in" type. Indeed, the management of the various categories of objects is implemented by the server by means of the modules 21 to 25 and the functions for editing and consulting an object executed by the application are executed on the basis of the program instructions DINST received from the processing module 21 to 23 associated with the category of object considered, without it being necessary to load or to install another program or to perform any configuration.

According to another embodiment, a software update of the application 6 will be performed on the basis of the server 20, by installing a plug-in of the application 6 or a Flash application allowing the execution of editing functions identical to those described for the program instructions transmitted and interpreted.

Figure 3:
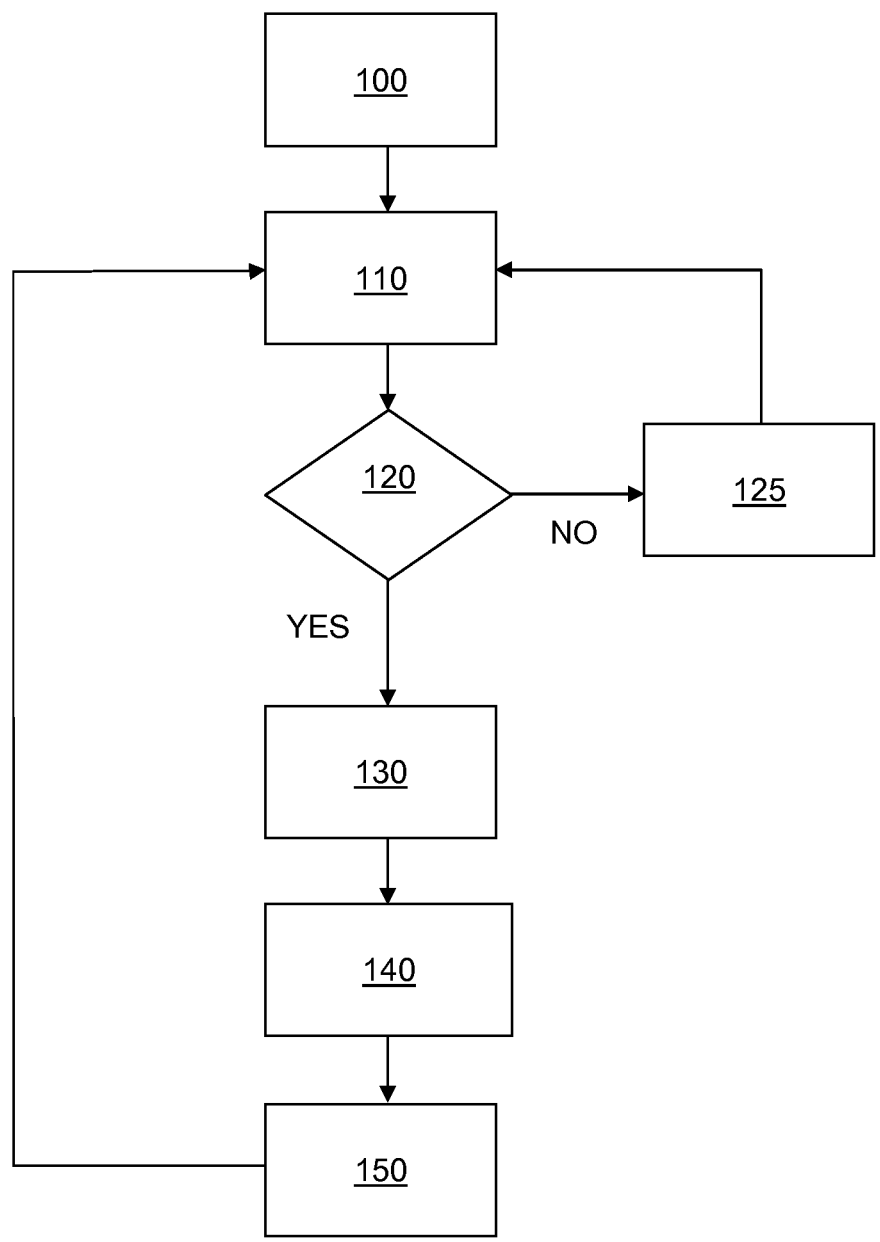
FIG. 3 represents a flowchart of an embodiment of a method according to the invention.

An embodiment of the method according to the invention is described by reference to FIGS. 3 and 4.

In step 100, a user establishes, between his terminal 5 and the server 20, by means of an application a communication link suitable for browsing the Web, and in particular on the Web site managed by the server 20. This application is typically an Internet browser. A Web page of a Wiki site is displayed in the user interface of the browser. This page has for example the appearance of the page 200A represented in FIG.

4: in the example described here, the page contains a summary sheet descriptive of a process, in accordance with the BPMN standard.

In step 110, the user asks to view a complete graphical representation of the process and clicks on the descriptive sheet. In response, and with the proviso that the user possesses the necessary rights, a new Web page having the appearance of the page 200B is displayed by the browser on the basis of descriptive data in the XML language which are provided by the common module 25 of the server 20 and are interpreted by the browser so as to produce a displayable graphical representation of the process. In the exemplary case described, this page contains a developed graphical representation of the process which complies with the BPMN standard.

In step 110, the user, by clicking on this graphical representation, asks to edit the graphical object consisting of the developed graphical representation of the process, thereby causing an edit request to be dispatched to the common module 25 of the server 20.

In step 120, on the basis of the information stored in the database 30, the common module 25 determines which is the category of the object for which an edit request has been received and whether there exists among the processing modules 21 to 23 a module which is associated with this category of object. If so, step 130 is executed. In the converse case, no processing module allowing the editing of this category of object being available, step 125 is executed.

In step 130, the common module 25 triggers the processing module associated with the category of object to be edited, for example the module 21. The module 21 then transmits to the browser a Web page to be displayed, having the appearance of the page 200C represented in FIG. 4 and already described, together with descriptive data DDESC1 describing said object, as well as program instructions DINST for an execution by the browser of functions for editing the object considered, that is to say of the graphical object consisting of the graphical representation of the process.

In step 140, the user proceeds to edit the graphical object. Then, when the user has finished editing this graphical object, he clicks on an icon, a menu box or a hypertext link or else uses a combination of keyboard keys (for example CTRL-S or ALT-S) to trigger the saving of the graphical object. This causes the XML-language descriptive data describing the modified object to be dispatched to the module 21 by the browser (either a modified description DDESC2 for updating the description DDESC1, or, as described above, data descriptive of at least some of the graphical elements making up the graphical representation DREPR2 of the modified object DOBJ). A new Web page is displayed, having the appearance of the page 200B represented in FIG. 4 and comprising a representation of the object such as modified.

In step 150, the processing module 21, on receipt of the data descriptive of the modified object, transfers them to the common module 25 for archiving in the database 30.

In step 125, executed following step 120, the common module 25 returns a response in the form of a Web page comprising a cue as to the impossibility of editing the object in the browser and suggesting to the user that he download a description file for this object. Should the user agree, a description, not in XML, but in a file format specific to the category of object to which this object belongs, is suggested on downloading.

The user can then modify this file if he has the appropriate software and then proceed to update the Wiki site by downloading the modified file to the Wiki site. On receipt of the file that has been modified by the server 20, the associated module performs the reverse conversion, that is to say from the format specific to the category of object to the XML format for updating the database 30 with a modified description in the XML format.

Step 110 is executed again after step 125 or after step 150, steps 110 to 150 being repeated with each request to edit an object.

The invention is equally applicable both to the updating of an existing object and to the creating of a new object: in the latter case the object edited according to the invention is a "virgin" object or a new object created on the basis of an object model, according to the known logic for creating a new document.

The invention is applicable to the implementation of collaborative processes between enterprises or between users having to share the editing of multimedia documents (technical specifications, commercial documentation, artistic compositions, etc) integrating objects of various categories (text, images, graphics, etc), for example:

collaborative composition of a graphical object representing a musical score, each composer user being able to modify the graphical elements of this score (note, clef, chord etc.) and save the new graphical score within the storage space associated with a Wiki site;

editing of a technical document comprising a diagram in accordance with BPMN, UML or some other process description standard;

shared editing of a graphical object representing a road map by various parties having access to information on one of the geographical places represented by this map.

The invention claimed is:

1. A method for editing an object represented in a page of a Web site, the method comprising:
    establishing, between a server and an application implemented by a terminal, a communication link for browsing said Web site;
    sending, by the server to said application, via said link, first description data describing said object for display of a graphical representation of said object in a user interface of said application; and
    sending, by the server to said application, via said link, program instructions, to identified by said server from among several sets of program instruction as a function of an identifier of a category of object to which said object belongs, said instructions including user interface data defining the user interface necessary for editing the object and said instructions being designed for execution by said application of functions for editing said graphical representation.

2. The method according to claim 1, further comprising:
    receiving via said link, by the server from the application, second description data relating to said object and generated utilizing said program instructions following an execution of at least one function for editing said object, triggered by a user of said terminal.

3. The method according to claim 2, in which the second description data are description data of said object or description data describing graphical elements constituting the graphical representation of said object.

4. The method according to claim 2, said method further comprising:
    storing data descriptive of said object and intended to be transmitted to a terminal requiring display of a Web page comprising a representation of said object; and
    updating the descriptive data stored by said server on the basis of the second description data.

5. The method according to claim 1, said method further comprising:
- identifying the category of object to which said object belongs based on a category identification stored in association with descriptive data of said object; and
- providing the program instructions identified by said server as a function of the identified category of object being transmitted by the server.

6. The method according to claim 1, in which said first description data are in a format interpretable by an application suitable for browsing the Web.

7. A non-transitory recording medium readable by a data processor on which a program is recorded comprising program code instructions for executing the steps of a method according to claim 1.

8. A server for the implementation of a method for editing an object represented in a page of a Web site, the server comprising:
- means for establishing, with an application implemented by a terminal, a communication link for browsing said Web site;
- means for dispatching to the application, via said link, first description data describing said object for display of a graphical representation of said object in a user interface of said application; and
- means for dispatching to the application, via said link, a set of program instructions, identified by said server from among several sets of program instruction as function of an identifier of specific to a category of object to which said object belongs, said instructions including user interface data defining the user interface necessary for editing the object and said instructions being designed for execution by said application of functions for editing said graphical representation.

9. The server according to claim 8, said server further comprising:
- means for receiving from the application, via said link, second description data relating to said object and generated by means of said program instructions following an execution of at least one function for editing said object, triggered by a user of said terminal.

10. The server according to claim 9, said server further comprising:
- means for storing descriptive data of said object intended to be transmitted to a terminal requiring a display of a Web page comprising a representation of said object; and
- means for updating the descriptive data stored by said server on the basis of the second description data received.

11. The server according to claim 8, said server further comprising:
- means for identifying the category of object to which said object belongs on the basis of a category identification stored in association with said descriptive data; and
- a said set of program instructions which is identified by said server from among several sets of program instruction as a function of the identified category of object being transmitted by said dispatching means.

* * * * *